United States Patent
Knaian et al.

(10) Patent No.: US 8,674,576 B2
(45) Date of Patent: Mar. 18, 2014

(54) ELECTROPERMANENT MAGNET-BASED MOTORS

(75) Inventors: Ara Knaian, Newton, MA (US); Neil Gershenfeld, Somerville, MA (US); Maxim Lobovsky, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 125 days.

(21) Appl. No.: 12/695,155

(22) Filed: Jan. 27, 2010

(65) Prior Publication Data

US 2010/0289359 A1 Nov. 18, 2010

Related U.S. Application Data

(60) Provisional application No. 61/147,508, filed on Jan. 27, 2009.

(51) Int. Cl.
*H02K 7/116* (2006.01)

(52) U.S. Cl.
USPC ............ 310/179; 310/195; 310/154.28

(58) Field of Classification Search
USPC ......... 310/179–181, 83, 195, 154.02, 154.28, 310/40 MM
See application file for complete search history.

(56) References Cited

U.S. PATENT DOCUMENTS

| | | | | |
|---|---|---|---|---|
| 2,128,044 A * | 8/1938 | Grabner | ...................... | 310/190 |
| 3,201,625 A * | 8/1965 | Smith et al. | .................... | 210/181 |
| 3,382,384 A * | 5/1968 | Hulls | .............................. | 310/93 |
| 3,427,484 A * | 2/1969 | Hall et al. | ...................... | 310/47 |
| 3,601,641 A * | 8/1971 | Baermann | ....................... | 310/93 |
| 3,686,524 A * | 8/1972 | Hall | ........................ | 310/154.22 |
| 5,327,033 A * | 7/1994 | Guckel et al. | .......... | 310/40 MM |
| 5,338,993 A * | 8/1994 | Briggs et al. | ..................... | 310/82 |
| 5,600,192 A * | 2/1997 | Carson et al. | ............... | 310/68 B |
| 5,959,377 A * | 9/1999 | Horng | ................... | 310/40 MM |
| 6,002,317 A * | 12/1999 | Pignataro | ...................... | 335/289 |
| 6,211,599 B1 * | 4/2001 | Barnes et al. | ................ | 310/309 |
| 6,563,248 B2 * | 5/2003 | Fujita | ........................... | 310/181 |
| 6,707,213 B2 * | 3/2004 | Fujita | ........................... | 310/181 |
| 6,713,908 B1 * | 3/2004 | Tai et al. | .................... | 310/68 R |
| 6,864,608 B2 * | 3/2005 | Kang et al. | .............. | 310/154.02 |
| 7,385,320 B2 * | 6/2008 | Kawamoto et al. | ........ | 310/49.22 |

(Continued)

OTHER PUBLICATIONS

David J Griffiths, Intro to electrodymanics 1999, Prentice Hall, 3rd edition, all 3 pages.*

*Primary Examiner* — Hanh Nguyen
*Assistant Examiner* — Naishadh Desai
(74) *Attorney, Agent, or Firm* — Norma E. Henderson

(57) ABSTRACT

An electropermanent magnet-based motor includes a stator having at least one electropermanent magnet, at least one coil around the electropermanent magnet configured to pass current pulses that affect the magnetization of the magnet, and a rotor that is movable with respect to the stator in response to changes in the magnetization of the electropermanent magnet. A wobble motor has a stator with a centrally-located core from which arms radiate outward, an electropermanent magnet and coil on each arm, and a rotor exterior to the stator such that the rotor can rotate around the stator arms. A rotary motor has a centrally-located rotor that rotates about its axis and a stator exterior to the rotor such that the rotor may rotate within the stator arms, the stator including an anteriorly-located stator core from which stator arms radiate inward toward the rotor, and an electropermanent magnet and coil on each stator arm.

15 Claims, 13 Drawing Sheets

(56) References Cited

U.S. PATENT DOCUMENTS

| | | | |
|---|---|---|---|
| 7,548,009 B2* | 6/2009 | Hsiao | 310/300 |
| 7,777,385 B2* | 8/2010 | Wingett et al. | 310/181 |
| 2003/0025418 A1* | 2/2003 | Kang et al. | 310/181 |
| 2005/0110364 A1* | 5/2005 | Yanagisawa | 310/261 |
| 2005/0242679 A1* | 11/2005 | Walter et al. | 310/181 |
| 2007/0200444 A1* | 8/2007 | Uenishi et al. | 310/154.21 |
| 2009/0115361 A1* | 5/2009 | Nitta | 318/400.09 |
| 2009/0250032 A1* | 10/2009 | Fullerton et al. | 123/143 B |

\* cited by examiner

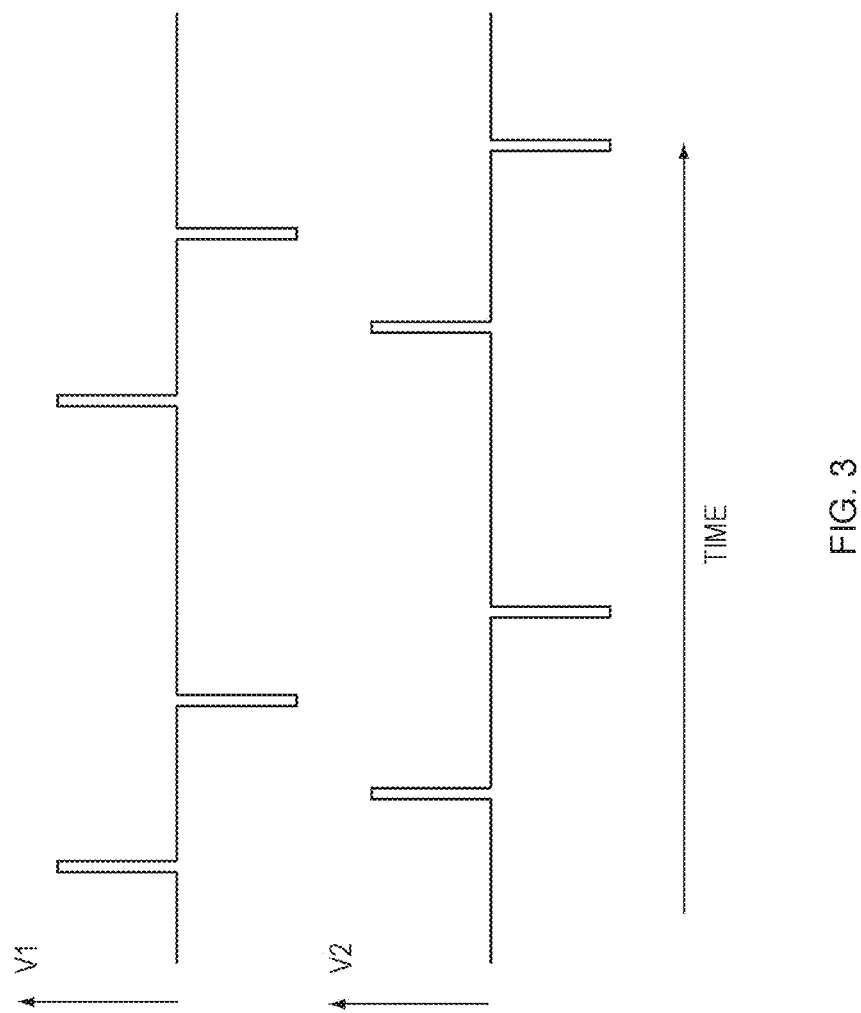

ELECTROPERMANENT MAGNET-BASED MOTORS

RELATED APPLICATIONS

This application claims the benefit of U.S. Provisional Application Ser. No. 61/147,508, filed Jan. 27, 2009, the entire disclosure of which is herein incorporated by reference.

STATEMENT REGARDING FEDERALLY SPONSORED RESEARCH OR DEVELOPMENT

This invention was made with U.S. government support under Grant number W911NF-08-1-0254, awarded by the Defense Advanced Research Projects Agency (DARPA). The government has certain rights in this invention.

FIELD OF THE TECHNOLOGY

The present invention relates to motors and, in particular, to motors and actuators employing electropermanent magnets.

BACKGROUND

The field of microrobotics seeks to construct mobile robots able to sense, move through, and manipulate their environment with dimensions on the order of millimeters or smaller. Microrobots have been constructed that roll, walk, swim, and fly. Microrobots are particularly useful because they can go to places other robots cannot, such as into the rubble at a disaster site, into a machine to repair it, or into the body for minimally invasive surgery. A major problem in microrobot design is supplying enough power for long run time. In the fields of microrobotics and programmable matter, there is therefore a need for actuators capable of electromechanical energy conversion at high torque and low speed, and capable of scaling to small dimensions without loss of efficiency.

The emerging field of programmable matter seeks to build macroscopic objects with thousands of actuatable degrees of freedom, so that their shape and function may be changed under software control. Like microrobots, programmable matter will also require efficient small-scale actuators.

A wide variety of micromotors and microactuators have been constructed that have their largest dimension measured in millimeters. These actuators have used a variety of operational principles, including magnetic, electrostatic, piezoelectric, and electrothermal. Because it is difficult and expensive to fabricate efficient speed-reducing power transmissions at microscale, an actuator that directly produces the high torques at low speeds efficiently would be desirable for robotics and programmable matter. Such an actuator could be advantageously be applied even with a speed-reducing (or speed-increasing) power transmission, but the transmission might not require as many stages, have as large a speed ratio, or as large a maximum speed as it would otherwise.

Magnetic motors dominate electrical to mechanical energy conversion at macroscale, powering a wide range of devices from industrial machine tools to household appliances to children's toys. These motors are available in a wide range of types (e.g. induction, servo, stepper) and configurations (e.g. rotary, linear) depending on the requirements of the application. Magnetic motors have two halves, a rotor and a stator. Electrical energy provided from an external source is used to produce a changing magnetic field at the interface between the rotor and stator, which propels the rotor and produces useful mechanical work.

Since the construction of the first electric motor by Michael Faraday in 1821, permanent magnets have been used in the construction of motors. In small electric motors (having a capacity less than one horsepower) permanent magnets are commonly used in order to improve efficiency and torque, and to simplify construction and drive. For example, in the brush-commutated permanent-magnet DC motor, a periodically-reversing current through coils on the rotor interacts with the magnetic field of permanent magnets on the stator to produce torque. A key design criterion for almost all permanent magnet motors is that the demagnetizing field inside the permanent magnets must not exceed a the demagnetizing threshold. Otherwise, the magnetic field of the magnets will be reduced by operation, and the motor will not function as well. Conventional permanent magnet motors are carefully designed to avoid demagnetization of their permanent magnets.

A notable exception is the hysteresis motor (such as, for example, that disclosed in U.S. Pat. No. 3,610,978) which works by continuously cycling a piece of magnetic material around its hysteresis loop, and generating continuous torque due to the time lag between field and flux while changing the magnetization of the material. The hysteresis motor is notable and useful for its ability to produce constant torque independent of speed. However, the hysteresis motor requires the continuous input of electric power to produce continuous torque, even at zero speed, and so has low efficiency at low speeds.

Electric motors suffer from a number of loss mechanisms that act to reduce their power efficiency. At high speeds, mechanical losses due to friction, and magnetic losses due to cyclic magnetization and demagnetization of the flux-carrying members dominate. Thus, flux-carrying materials (e.g. iron) for magnetic motors are typically selected to have the lowest possible coercivity and thus the lowest possible magnetic losses. At low speeds, loss due to resistive heating of the coils dominates. At the limit of zero speed, when the motor is stalled, 100% of the electrical energy input goes to resistive heating of the windings and the motor operates at zero percent efficiency.

SUMMARY

Motors and actuators according to the present invention have at least two sections (e.g. rotor and stator) that move relative to one another. At least one of these sections includes one or more electro-permanent magnets. Passing current through (the coil of) these electropermanent magnets changes the magnetization of the materials inside, storing energy in the magnetic materials, changing the force they exert on the other member, and causing relative movement. After the current is removed, the motor continues to exert force and do work for a period of time, as stored magnetic energy in the magnets is converted to mechanical work. Applying sequential current pulses to multiple electropermanent magnets results in continuous motion. Also, sensing the relative positions of the sections and controlling the timing, magnitude, or shape of the applied pulses allows for precise control of position or speed. The relative position of the sections may be sensed by external means, or may be sensed by measuring the voltage or current in the coil. A motor according to the invention can produce torque efficiently when operated at low speeds, or equivalently, when the motor is constructed at small dimensions, a large rotational speed (in revolutions per minute) will still result in a low linear speed between rotor and stator. A motor according to the invention does not require electrical power in stall, so that it can operate with greater than zero efficiency as the speed approaches zero.

In one aspect, the invention is an electropermanent magnet-based motor that includes a stator having at least one electropermanent magnet, at least one coil that is wound around each electropermanent magnet and configured to pass current pulses that affect the magnetization of the magnet, and a rotor that is movable with respect to the stator in response to changes in the magnetization of the electropermanent magnets. In a preferred embodiment, the electropermanent magnets each comprise two independently-controllable magnets made of differently magnetizable materials.

In one aspect, the invention is an electropermanent magnet-based motor having a wobble configuration, including a stator having a centrally-located stator core from which stator arms radiate outward, an electropermanent magnet that is integral to each stator arm, and a coil that is located around the electropermanent magnet on each stator arm and a rotor positioned exterior to the stator in such a configuration that the rotor can rotate around the stator arms. In some embodiments, the stator core and stator arms may be formed from a single piece of material such as, but not limited to, iron. In a preferred embodiment, there are two independently-controllable magnets attached to each stator arm, each made from a material having a different coercivity. In a preferred embodiment, one has a very high coercivity and one has a substantially lower coercivity, but still substantially higher than the coercivity of the flux-guiding members. The end of each stator arm and the interior of the rotor may have integrated gear teeth designed to mesh with each other. Alternatively, or in addition, there may be a high-friction coating the rotor and/or stator surfaces. One embodiment includes dual coaxial gear wheels with gear wheel teeth located above and below the plane occupied by the stator and the rotor is a ring sandwiched between two rotor gears having rotor teeth designed to mate with the gear wheel teeth of the stator gear wheels.

In another aspect, the invention is an electropermanent magnet-based motor having a rotary configuration, including a centrally-located rotor configured to rotate about its axis, optionally about a shaft, and a stator that is exterior to the rotor, the rotor being located within the stator in such a way that the rotor may rotate within the stator arms, the stator including an anteriorly-located stator core from which stator arms radiate inward toward the rotor, an electropermanent magnet that is integral to each stator arm, and a coil that is located around the electropermanent magnet on each stator arm. In some embodiments, the stator core and stator arms may be formed from a single piece of material such as, but not limited to, iron. In a preferred embodiment, there are two independently-controllable magnets attached to each stator arm, each made from a material having a different coercivity. In a preferred embodiment, one has a very high coercivity and one has a substantially lower coercivity, but still substantially higher than the coercivity of the flux-guiding members. The end of each stator arm and the exterior of the rotor may have integrated gear teeth designed to mesh with each other. Alternatively, or in addition, there may be a high-friction coating the rotor and/or stator surfaces.

The invention advantageously utilizes electro-permanent magnets in motors and actuators. Motors and actuators using electro-permanent magnets are useful over the present art in motor design and construction due to their ability to achieve high efficiency when run at low speeds and/or when fabricated with small dimensions. Because current flows through the windings for only a small fraction of the time that the motor is producing torque, and that fraction is lower when the motor turns more slowly, losses due to resistive heating of the windings when the motor is run at low speeds are greatly reduced. With a motor constructed according to the present invention, there is a relatively constant resistive and hysteresis energy loss per revolution, independent of speed, in contrast to a conventional permanent-magnet motor, where the energy is continuously dissipated due to resistive power loss, even if the motor is stalled. The technology of the present invention is particularly suitable for micromotors and microactuators for use in the fields of microrobotics and programmable matter.

BRIEF DESCRIPTION OF THE DRAWINGS

Other aspects, advantages and novel features of the invention will become more apparent from the following detailed description of the invention when considered in conjunction with the accompanying drawings wherein:

FIG. 3 depicts a drive waveform for an exemplary embodiment of an electropermanent stepper motor, wobble configuration, according to one aspect of the present invention;

DETAILED DESCRIPTION

Figure 1A:
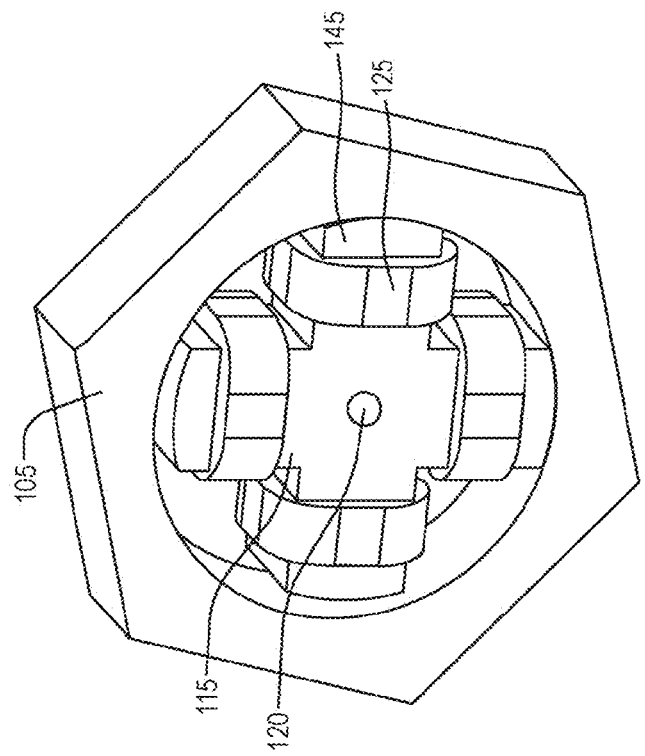
FIGS. 1A and 1B depict an exemplary embodiment of an electropermanent stepper motor, wobble configuration, before and after the installation of coils, respectively, according to one aspect of the present invention.

The present invention employs electro-permanent magnets in motors and actuators. Motors/actuators according to the present invention have at least two sections, rotor and stator, that move relative to one another. At least one of these sections includes one or more electro-permanent magnets. Passing current through the coil of the electropermanent magnets changes the magnetization of the materials inside, changing the force they exert on the other member, causing relative movement. Applying sequential current pulses to multiple electropermanent magnets results in continuous motion. Also, sensing the relative positions of the sections and controlling the timing, magnitude, or shape of the applied pulses allows for precise control of position or speed. The relative position of the sections may be sensed by external means, or may be sensed by measuring the voltage or current in the coil.

As used herein, the following terms expressly include, but are not to be limited to:

"Electropermanent magnets" means magnetic assemblies whose holding force can be substantially modified by electrical pulses. An electropermanent magnet is a device undergoes a substantial change in its magnetization upon stimulus with a current pulse. After the current is returned to zero or a low level, the magnetization remains substantially changed. An electro-permanent magnet can receive energy in a short current pulse, and after the pulse is completed, continue to apply a magnetic force on another member through an air gap for a much longer time than the length of the pulse. Electropermanent magnets are further described in, for example, U.S. Pat. Nos. 4,075,589, 6,002,317, and 6,229,422.

"Rotor" means the rotating member of an electrical machine or device, such as the rotating armature of a motor or generator.

"Stator" means the portion of a rotating machine that contains the stationary parts of the magnetic circuit and, sometimes, their associated windings.

Because electropermanent magnets pull with significant force even at large distances and consume low power at small dimensions, motors and actuators employing electropermanent magnets according to the present invention are extremely efficient, consuming low power at small dimensions and slow speeds. A number of different embodiments have been designed and implemented, including an electropermanent stepper motor with a wobble configuration, an electro-permanent stepper motor with a rotary configuration, electro-permanent motors with a monolithic stator core, electro-permanent motors with integrated gear teeth, electro-permanent motors with coaxial contact wheels, and an electropermanent linear actuator. In one embodiment, an electropermanent stepper motor is used to actuate the rotary joints of a programmable matter system.

Electropermanent Stepper Motor with Wobble Configuration. In one exemplary embodiment, called the "Electropermanent Wobble Stepper Motor" there are two sections, a rotor and a stator. The stator is in the center, and the rotor revolves around it. In a preferred embodiment, most parts of the rotor and stator are made of iron, selected for its low coercivity and high saturation flux density. The outer profile of the rotor is generally circular in shape with a given diameter, and the inner profile of the rotor is circular in shape, but with a slightly smaller diameter. Each arm of the rotor contains an electropermanent magnet. These electropermanent magnets consist of two permanent magnet materials placed side-by-side. In a preferred embodiment, one material is Nd—Fe—B (neodymium-iron-boron) permanent magnet alloy and the other material is Alnico 5 alloy (aluminum-iron-nickel-cobalt-copper). A coil of copper wire is wrapped around each arm of the stator. The coils on opposing arms are connected together, forming a four-wire device with two electrical phases.

Figure 1B:
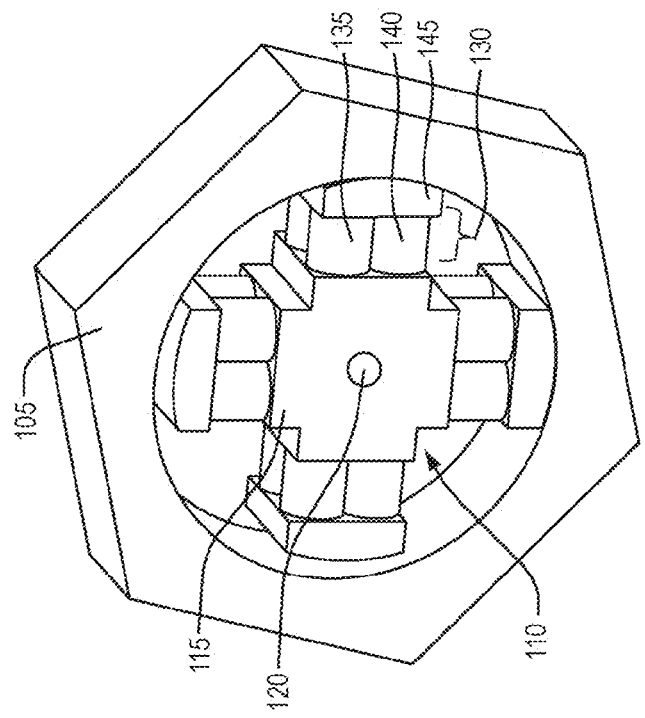
Figure 2B:
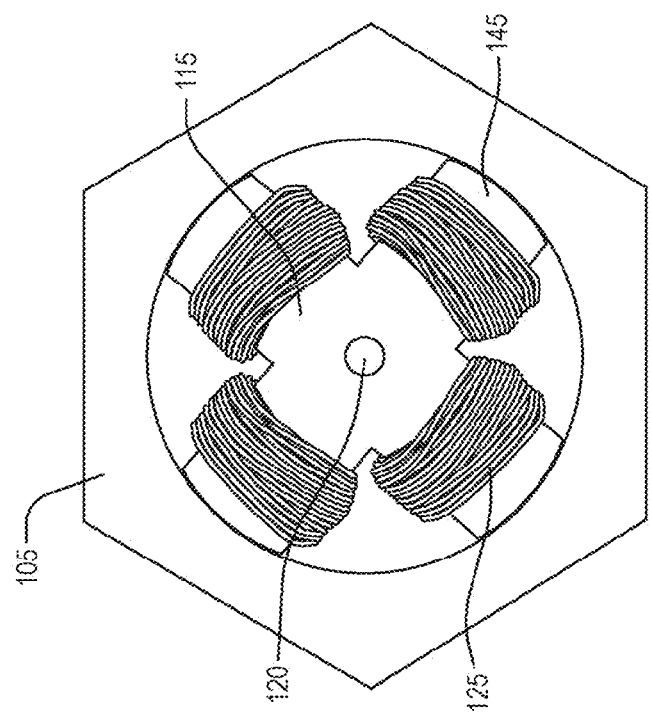
FIGS. 2A and 2B depict a plan view of an exemplary embodiment of an electropermanent stepper motor, wobble configuration, before and after the installation of coils, respectively, according to one aspect of the present invention.
Figure 2A:
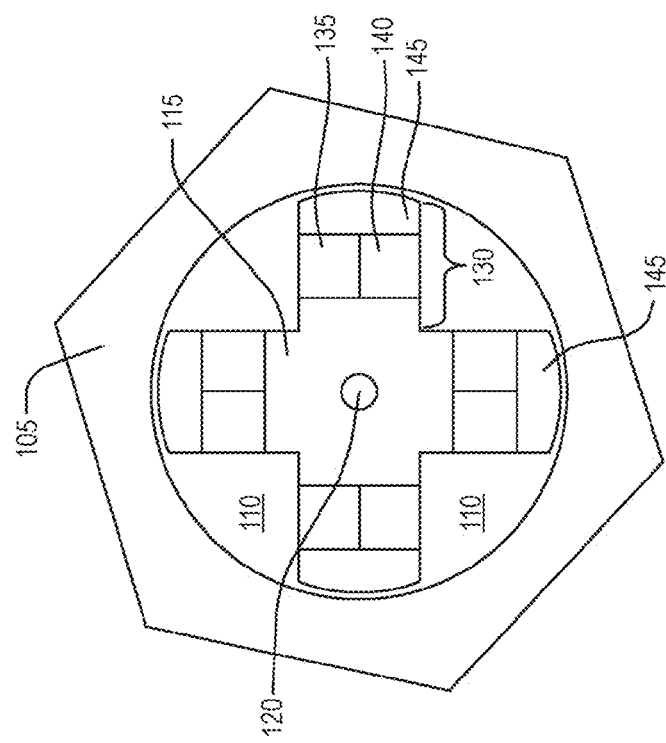

FIGS. 1A and 1B depict an exemplary embodiment of an electropermanent stepper motor, wobble configuration, before and after the installation of coils, respectively, according to one aspect of the present invention. In the exemplary embodiment of FIGS. 1A and 1B, rotor 105 is outside stator 110, which comprises stator core 115, optional stator mounting hole 120, coils 125, and stator arms 130, which comprise Alnico magnets 135, NdFeB magnets 140, and stator arm ends 145. FIGS. 2A and 2B depict a plan view of the exemplary embodiment of FIGS. 1A and 1B, respectively.

An electropermanent wobble stepper motor according to the present invention operates as follows: In the initial condition, two adjacent magnets are on and the other two are off. This causes the rotor to adhere to the stator at the ends of the two stator arms for which the magnets are on. A pulse of current through one the electrical phases, in the proper direction, simultaneously turns off the magnet on one of its arms and turns on the magnet on its opposing arm. Now the rotor pivots around the magnet on the perpendicular arm, which stays on continuously, moving away from the magnet that switched off and toward the magnet that switched on. This results in a rotation and translation of the rotor relative to the stator. By energizing the electrical phases as shown in the figure, rotation can proceed in either direction.

A prototype embodiment of an electropermanent stepper motor with this configuration was fabricated in the lab. The iron portions of the rotor and stator were made from ¼ inch thick iron plate, grade ASTM-A848, purchased from Scientific Alloys, Inc (Westerly, R.I.). The permanent magnets were ⅛" diameter and ⅛" long. The Nd—Fe—B magnets were purchased from Amazing Magnets, Inc. (Irvine, Calif.), part number R125A. The Alnico magnets were purchased from McMaster-Carr Industrial Supply Co. (Robinsville, N.J.), part number 5852K11. As purchased, the alnico magnets were longer than the needed length. The magnets were cut to length using a diamond saw, purchased from MTI Corporation (Richmond, Calif.), model number EC400. A section of the iron plate was cut out and surfaced flat and parallel to ¼" using a vertical milling machine (HAAS Super Mini-Mill, HAAS Automation Inc., Oxnard, Calif.). Then, an abrasive water jet cutter (OMAX JetMachining Center, Model 2652, OMAX Corporation, Kent, Wash.) was used to cut the online of the center of the stator. The stator was secured in the mill with a screw through the center hole and wax-gluing. The vertical mill was then used to surface the four magnet-mating ends, making them flat, smooth, and square. The center of the stator was removed and cleaned in heated isopropanol, heated to 50 C, until no more wax was visible.

The magnets were glued to the center of the stator, in the configuration shown in FIGS. 1A-B and 2A-B, using cyanoacrylate adhesive (Loctite 409 Gel Adhesive, Henkel Corporation, Dusseldorf, Germany). Each arm of the stator has two Nd—Fe—B magnets and two Alnico magnets. The two Nd—Fe—B magnets on each arm have the same polarity. The Nd—Fe—B magnets on adjacent faces have opposing polarity. For example, if the magnets on one arm are mounted north-out, the magnets on the adjacent arms should be north-in. The mounting polarity of the Alnico magnets during construction is not critical, since they will have their magnetization changed during operation, but it is easier to assemble the device if they are mounted with opposite polarity to the Nd—Fe—B magnets on their arm.

The ends of the stator arms were cut out, tabbed together, on the abrasive waterjet, and the magnet-mating side was finished on the vertical milling machine. The tabs holding the pieces together were cut using a hacksaw, and the remnants of the tabs were filed down using a metal file. The stator ends were cleaned in heated isopropanol at 50 C. The stator ends were then glued onto the magnets using Loctite 409 adhesive, and 24 hours were allowed to pass in order for the glue to fully set. The stator was fastened for machining on the vertical mill, again using the screw and wax-gluing method for mounting. Using a large number of gentle passes with an end mill, a circular profile was cut on the outside of the stator.

Next, 80 turns of 33AWG bondable magnet wire (MWS Wire industries, Westlake Village, Calif.) were wound around each arm. Opposing magnets are electrically connected and wound in the same direction (e.g. counterclockwise) so the device has four leads and two electrical phases. The wires were secured in place at the four corners of the stator with a few drops of the cyanoacrylate adhesive. Then the stator was machined. The profile of the stator was cut out from the ¼" iron plate, keeping the inner circle slightly undersized, and the inner circle was finished with a 13/16" reamer.

To drive the motor, two open-source motor controller boards (Robot Power Inc, S. Roy Wash.) were used, one for each electrical phase, both controlled by a single ATMEL AVR microcontroller (Atmel Corporation, San Jose, Calif.). The microcontroller was programmed to drive the two phases with the pulse sequence shown in FIG. 3, using 100 microsecond long pulses, and spacing the pulses 10 milliseconds apart. The power supply voltage was 24V. Two 1000 uF decoupling capacitors in parallel on the power rails provided the needed charge to supply the required 5-10A instantaneous current to drive the motor.

Figure 4:
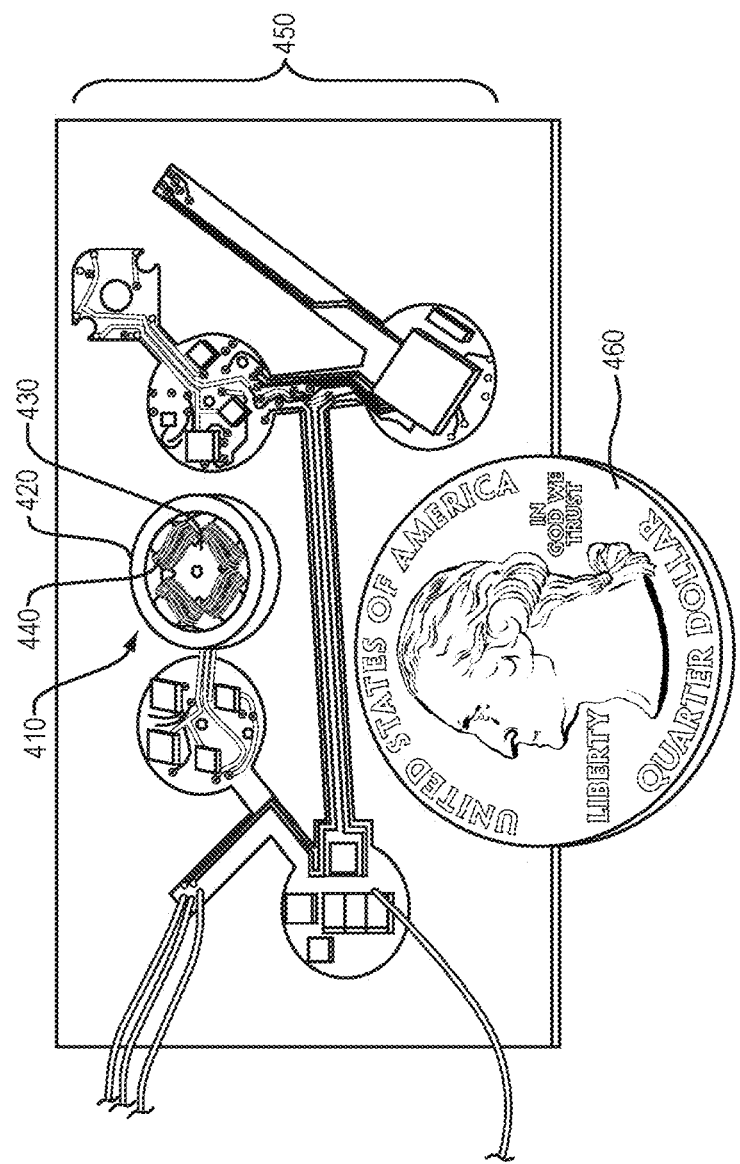
FIG. 4 depicts a prototype embodiment of an electropermanent stepper motor, wobble configuration, according to one aspect of the present invention, with associated drive circuitry, and a quarter shown for scale.

FIG. 4 depicts another prototype embodiment of an electropermanent stepper motor, wobble configuration, according to one aspect of the present invention. Shown in FIG. 4 are stepper motor 410, including rotor 420, stator core 430, and coils 440, associated drive circuitry 450, and a quarter 460 shown for scale.

Figure 5:
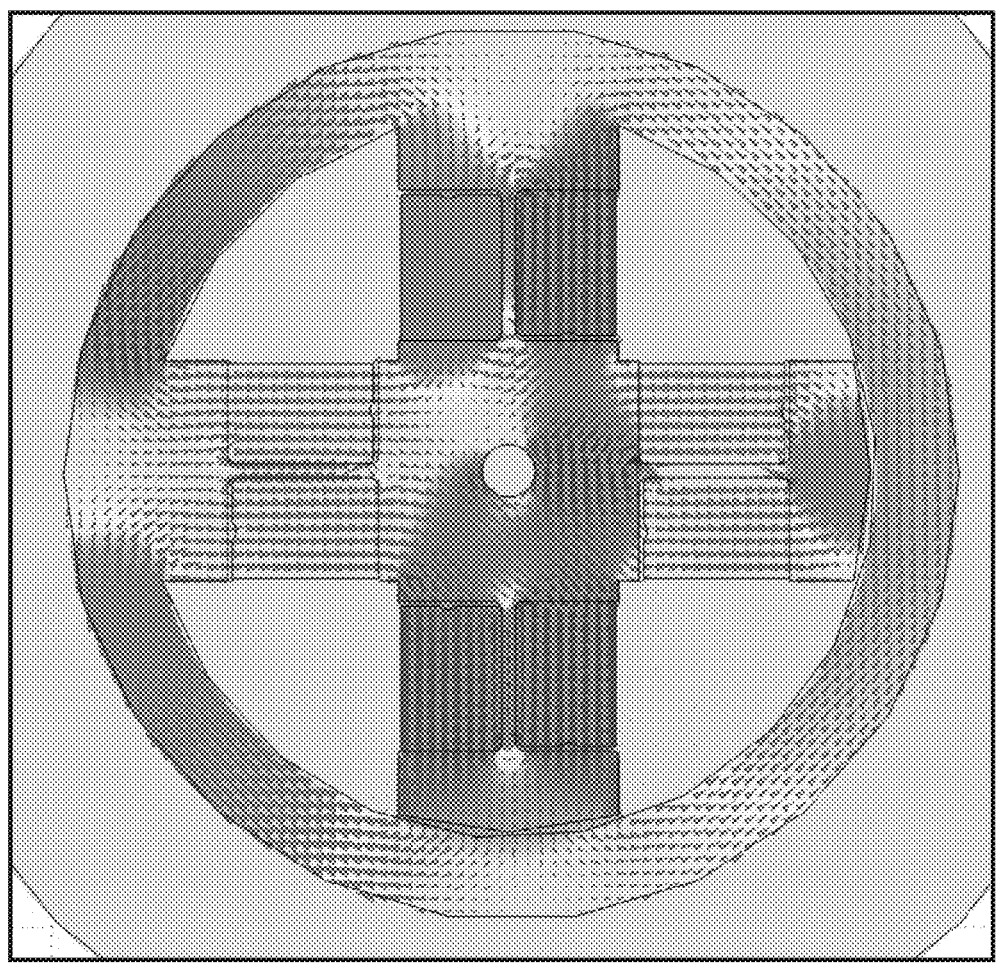
FIG. 5 is a diagram of the magnetic field diagram inside an exemplary stepper motor according to one aspect of the present invention, showing circulating flux in the inactive arms and flow of flux through the two active arms in a large loop.

FIG. 5 is a diagram of the magnetic fields inside an exemplary stepper motor according to one aspect of the present invention, showing circulating flux in the inactive arms (in a small loop, between the two magnets in the arm) and flow of flux through the two active arms (in a large loop, through both arms). Test results for the pictured stepper were 50 gram-mm torque and 1.2 Joules/Revolution energy consumption.

It will be clear to a person skilled in the art of the invention that many wiring and drive variants are possible. For example, one wire from each electrical phase of the motor may be connected together to form a common lead, and then the motor would become a three-wire device. This could be advantageous, because it would reduce the number of wires to connect the device to the drive circuit, and reduce the number of switches (e.g. transistors) required of the drive circuit, while still allowing the drive waveforms shown in the figure. In a motor with more than two electrical phases, similar common connections of leads would be possible. Alternatively, in another wiring variant, each side of each of the coils of the motor could be connected independently, making the motor, with four arms, into an eight-wire device. In yet another alternative, one lead of each coil could be connected to a common, and then the other wire from each coil could be connected to a common, making the four arm motor a five-wire device. These wiring arrangements would allow opposite coils to be activated independently, which could be advantageous because shifting the pulse that turns on and off opposite coils somewhat in time could result in energy savings.

It will further be clear to a person skilled in the art that different numbers of stator arms are also possible. In different configurations, there are constraints on the number of stator arms. For example, using the Nd—Fe—B/Alnico electropermanent magnets that are only designed to be switched to one polarity or off, and designing to keep magnetic flux inside the iron as much as possible, there is a need for the polarities of the magnets to alternate around the outside, and this limits the number of arms to even numbers. However, using electropermanent magnets that can be switched to either polarity, or in systems where continuous rotation is not required, or using a mix of electropermanent magnets and electromagnets, or with a variety of other variations to the design, and odd number of poles are possible and may be advantageous in certain applications.

It will also be clear to a person skilled in the art that the functionality of the rotor and stator may be modified. For example, the part called the rotor could be stationary, and the part called the stator could rotate. In the embodiments described, the coils are placed on the stationary part for ease of wiring, making these embodiments brushless motors. However, it is possible to construct a variant of this design using a mechanical commutation to sequence the pulses, and then it would be advantageous for the portion of the motor containing the coils to move. Similarly, if the drive circuit was on the rotating part, then it would be advantageous for the coils to be on the rotating part.

It will further be clear to a person skilled in the art that the part with the coils may be external, and the other part could be internal (e.g. a rotating round shaft surrounded by magnets). An embodiment with this configuration is discussed later. While the external rotor configuration was employed in the preferred embodiment for its increased torque, machine configuration requirements, manufacturability, or a variety of other considerations might make the magnets-external configuration preferable.

It will similarly be clear to a person skilled in the art that materials other than the iron, Nd—Fe—B alloy, Alnico 5 alloy, and copper used in the disclosed embodiments could be advantageously employed in the present invention. The iron was chosen for its high permeability, low coercivity, and high saturation flux density. The Nd—Fe—B was chosen for its high remnant flux density and high coercivity. The Alnico 5 was chosen for its similar remnant flux density to the Nd—Fe—B and its coercivity between that of the iron and that of the Nd—Fe—B.

It will additionally be clear to a person skilled in the art that the motor described above, with its eccentric rotation pattern, could be coupled to a shaft in more-or-less pure rotation (e.g. a shaft fixed by a bearing) using a variety of misalignment coupling techniques, such as, but not limited to, a bushed pin type coupling, Universal coupling, Oldham coupling, Bellows coupling, Spider coupling, Thompson coupling, Resilient Coupling, or Disc coupling. It will also be clear to a person skilled in the art that several of these motors could be connected to a shaft with couplers, with at least some of the motors out of phase to one another, to realize what is known in the electric motor art as a multistack stepper motor.

In addition, it will be clear to one of skill in the art that some parts of the rotor or stator serving a primarily structural function might be made of a nonmagnetic material, rather than a magnetic material such as iron. This might be preferable to reduce weight or to increase mechanical strength. The rotor and stator may be made of a laminated stack of layers of magnetic material interspersed with layers of non-conductive material, to reduce eddy current losses.

In another variant of the invention, the electropermanent magnets on the arms could use two bars of the same, or similar, material in parallel, each surrounded by a separate coil. This magnet could then be set to either magnetic polarity, or off. This could be desirable because it would allow a motor with an odd number of arms, for example, three. In another alternative, the electropermanent magnets on the arms could be a single block of one material, wound with a coil. In this variant, the magnet would be turned on by a large energy pulse, and then turned off by an alternating sequence of opposite polarity pulses with decreasing energy. This could be desirable because it involves a smaller number of materials.

In another variant of the invention, one or more of the magnets is driven partially, not all the way to saturation. This could be done, for example, by a high-energy magnetizing current pulse in one direction, followed by a shorter, lower-energy demagnetizing pulse in the other direction. This would allow for micro-stepping, for finer position control than possible with discrete steps. In another variant of the invention, a heater is used to heat one or more of the permanent magnet materials before or during the current pulse, reducing the energy of the pulse required to switch its magnetization.

In another variant of the invention, rather than using two hard magnetic materials of differing coercivity in parallel in the magnetic circuit, a thick and thin piece of the same material could be placed in parallel in the magnetic circuit. In this variant, the thicknesses would be selected so that the magnetomotive force from the current pulses through the coil would be sufficient to flip the magnetization in the thin piece of material, but not in the thick piece.

In one embodiment of the invention, the mechanical interface is separated from the magnetic interface by sandwiching the existing stator between two slightly-larger-diameter plates, so the mechanical contact is made with the plates rather than with the magnetic components. This is advantageous because then the contact components can be made of a hard, wear-resistant, non-corroding, non-magnetic material such as, but not limited to, stainless steel and because assembly and manufacturing are simplified.

Figure 6A:
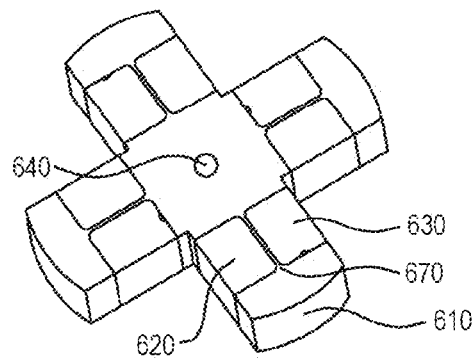
FIGS. 6A-C depict an exemplary embodiment of an electropermanent stepper motor, wobble configuration, with a monolithic iron stator flux-guide, before the installation of the rotor and coils (FIG. 6A), after installation of the rotor (FIG. 6B), and after installation of both the rotor and coils (FIG. 6C), according to one aspect of the present invention.
Figure 6B:
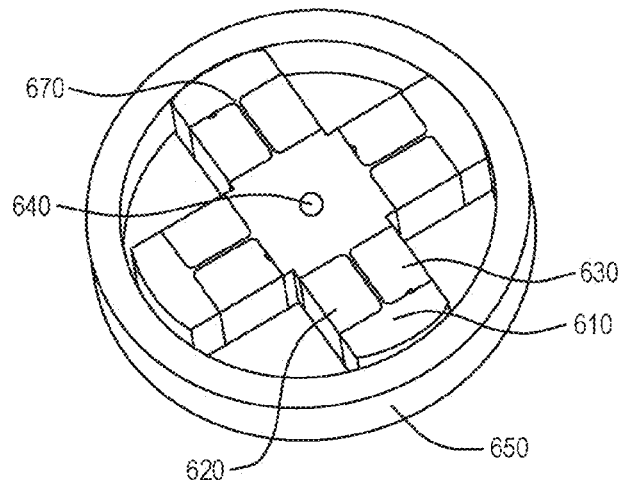
Figure 6C:
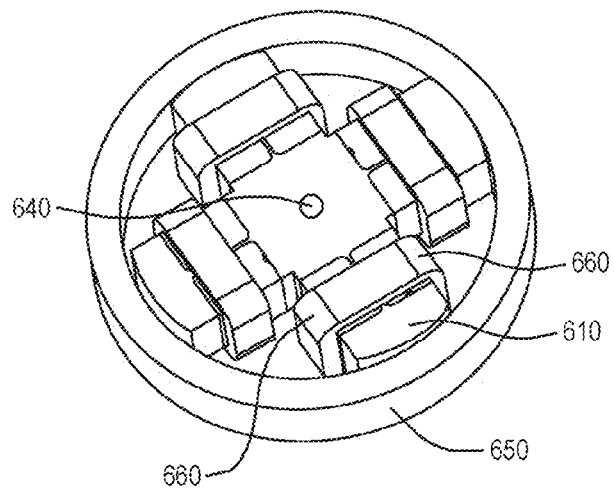

The magnet-containing arms of any of the motors described herein may be constructed with a monolithic flux-guiding structure. FIGS. 6A-C depict an exemplary embodiment of an electropermanent wobble stepper motor that is similar to the embodiment of FIGS. 1A-B and 2A-B, but with the flux-guiding portion of the stator being made from a single piece of material. In the embodiment of FIGS. 6A-C, monolithic iron stator flux-guide 610 is formed from a single iron piece, integrating the stator core and stator arm tips. Inserted into stator core 610 are Alnico magnets 620 and Nd—Fe—B magnets 630. As shown, stator core 610 also has optional mounting hole 640. Rotor 650 rotates around stator 610. Coils 660 are wrapped around or inserted over the arms of stator 610 in order to permit switching of the magnetization of the electropermanent magnet on each arm. Note that after insertion of magnets 620, 630, a thin metal tether 670 runs from the core of stator 610 to the tip of each arm. It will be clear to one of skill in the art that this pictured embodiment is exemplary only, and that any of the variations discussed in conjunction with the embodiment of FIGS. 1A-B and 2A-B would also be suitable for use in an embodiment with a monolithic stator.

Using this design, stator fabrication and motor assembly is simplified, since the flux-guiding portion can be cut from a single piece of material (for example, but not limited to, iron) using a low-cost two-dimensional manufacturing process, and then the magnets and coils are assembled onto that piece. In the design shown in FIGS. 6A-C, there will be flux leakage in the thin iron tether 670 connecting the stator arms to the stator core, because the thin metal arm conducts back some of the magnetic flux, and this flux leakage will tend to reduce the performance of the motor. However, this design may still be preferable for some applications, particularly because of its advantages in manufacturability.

Electropermanent Stepper Motor with Integrated Gear Teeth. In another embodiment of the invention, the rotor and the stator have protruding teeth. Preferably, the pitch of these teeth is set so that the motor advances by an integer number of teeth per step. This is preferable because it allows the motor to resist larger opposing torques without slipping. Adding gear teeth at the rotor/stator interface reduces the reliance on friction for operation, improving torque and reliability.

Figure 7B:
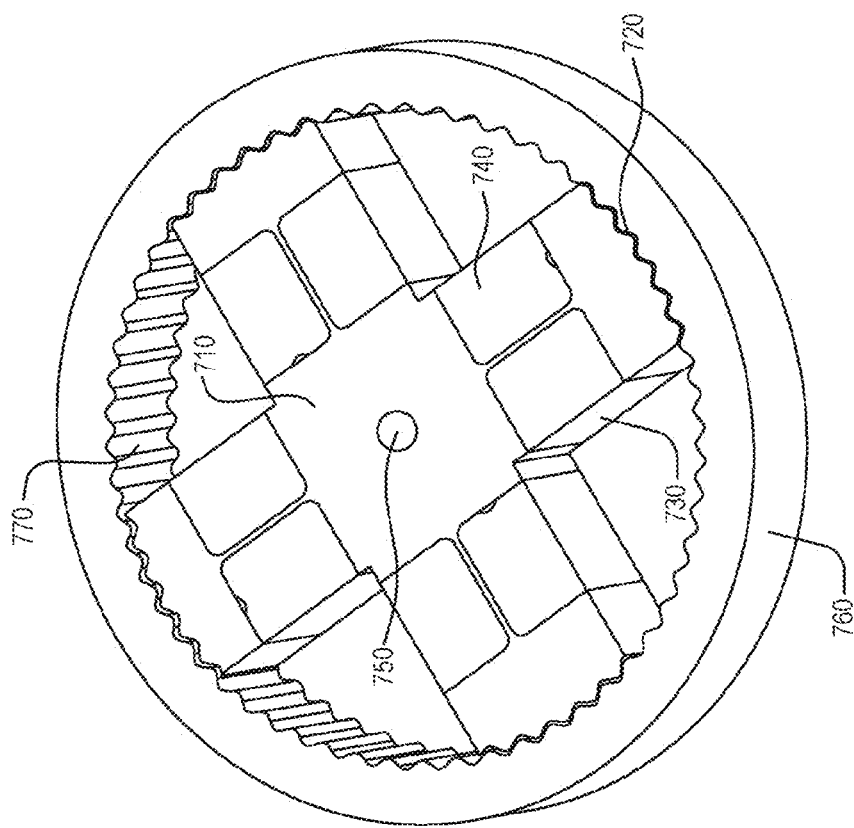
FIGS. 7A and 7B depict an exemplary embodiment of an electropermanent stepper motor, wobble configuration, with integrated gear teeth on rotor and stator, according to one aspect of the present invention.
Figure 7A:
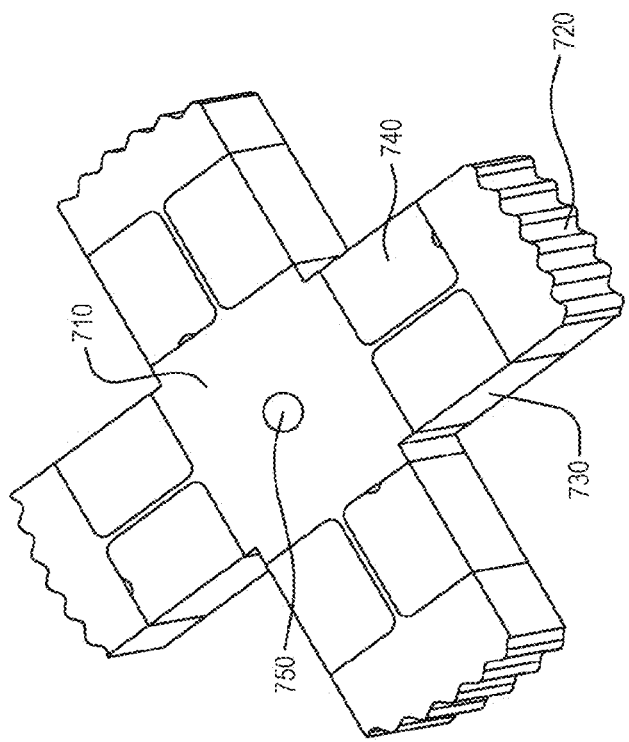

FIGS. 7A and 7B depict an exemplary embodiment of an electropermanent stepper motor, wobble configuration, with integrated gear teeth on the rotor and stator. In the exemplary embodiment of FIGS. 7A and 7B, one-iron-piece stator 710 has integrated stator gear teeth 720 on the end of each arm. Each arm of stator 710 also has Nd—Fe—B magnet 730 and Alnico magnet 740 inserted into slots in the stator flux-guide 710, which has optional mounting hole 750. The coils in this embodiment are not shown in FIGS. 7A-B so that magnets 730, 740 are visible, but are located as in the exemplary embodiment of FIGS. 1A-B and 2A-B. Stator 710 meshes with rotor 760, which was constructed from iron in the prototype embodiment, at rotor gear teeth 770. Gear teeth 720, 770 for stator 710 and rotor 760 are preferably fabricated onto their contacting surfaces.

When the properties of a prototype of the embodiment of FIGS. 6A-C were measured, it was found that the motor torque is generally limited by slip between the rotor and stator. One approach to reduction of slip is the use of a high-friction coating such as silicone rubber or sand on the rotor or stator surfaces. Another approach is the fabrication of gear teeth onto the rotor and stator, as in the embodiment of FIGS. 7A-B. The gear teeth increase the torque needed to cause the motor to slip, by increasing the pressure angle between the rotor and stator. It will be clear to one of skill in the art of the invention that a combination of these two approaches, gear teeth with a high-friction coating, is also possible and may be advantageously employed in certain applications. The teeth should be constructed so that the rotor and stator teeth have the same module, in order to allow them to mesh. The use of teeth on wobble motors in order to increase running torque is further described in, for example, Suzumori, K. Hori, K., "Micro electrostatic wobble motor with toothed electrodes", Micro Electro Mechanical Systems, 1997. MEMS '97, Proceedings, IEEE., Tenth Annual International Workshop on, pp. 227-232, Nagoya, Japan.

Electropermanent Wobble Motor with Coaxial Gearing. In the design of a motor with integrated gear teeth, because the tooth tips serve both a mechanical and a magnetic function, there are trade-offs selection of the material and design of the shape of the teeth; where one design or selection would be preferable from a magnetic perspective, another design or selection may be preferable from a mechanical perspective. For example, while mechanically it would be preferable to construct the gear teeth from a hard, durable, and non-corroding material, such as, but not limited to, sapphire-coated stainless steel, these materials have greatly inferior magnetic properties when compared to specialized magnetic materials such as annealed pure iron, iron silicon alloys, and iron-cobalt-vanadium alloys (which in turn have inferior mechanical properties). In finite-element studies of the field patterns from geared teeth, it has been found that the direction of the magnetic field is influenced by the tooth shape. Therefore, the optimal magnetic shape for tooth tips may be different than the optimal mechanical shape.

In order to address both of the foregoing issues, an electropermanent wobble motor can be constructed with co-axial contact wheels, e.g. toothed gear wheels, attached above and below the stator. The wheels may have gear teeth to transmit torque, as shown in FIGS. 8A-D, or may simply be circular rollers. The contact wheels are designed to protrude farther than the magnetic components, so that that contact wheels come into contact with one another, while the magnetic components act on each other without touching. Therefore, the contact wheels will provide the mechanical function, the magnetic components will provide the magnetic function, and the design of each can then be optimized separately for best performance. For example, the contact wheels may be constructed of stainless steel, and the arm tips may be constructed of annealed magnetic-grade iron.

Figure 8A:
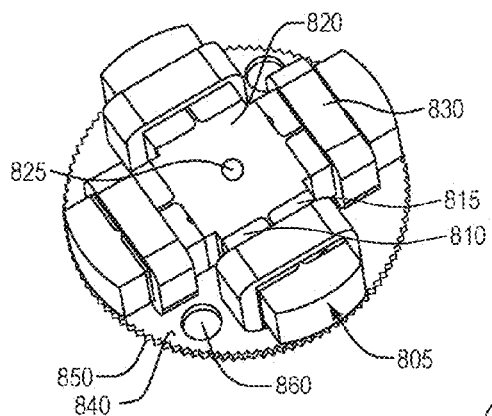
FIGS. 8A-D depict an exemplary embodiment of an electropermanent stepper motor, wobble configuration, with coaxial gearing, according to one aspect of the present invention.
Figure 8B:
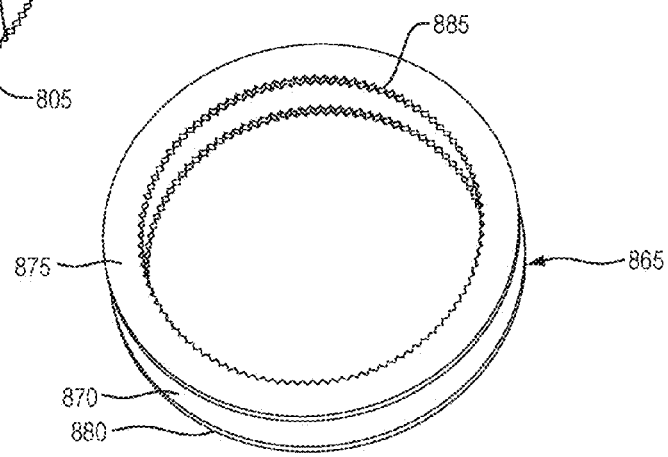
Figure 8C:
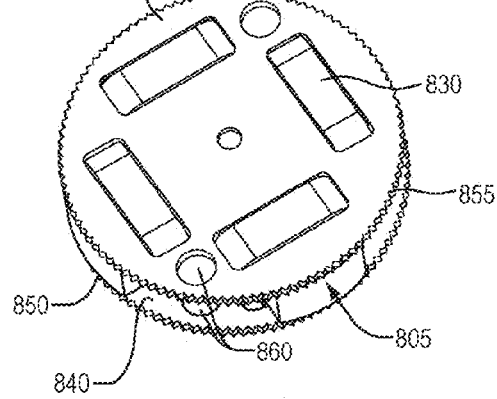
Figure 8D:
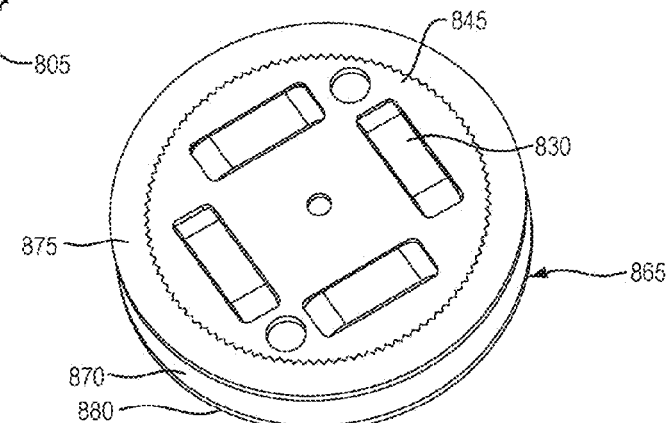

FIGS. 8A-D depict an exemplary embodiment of an electropermanent stepper motor, wobble configuration, with dual coaxial gear wheels. FIG. 8A shows the stator assembly and lower gear wheel, with top wheel having been removed for clarity. FIG. 8B depicts the corresponding rotor. FIG. 8C depicts the stator and gear wheel assembly before installation of the rotor, and FIG. 8D depicts the full assembly (rotor, stator, and both coaxial gear wheels). In the exemplary embodiment of FIGS. 8A-D, stator 805 has four Alnico magnets 810, four Nd—Fe—B magnets 815, monolithic stator flux-guiding component 820 with semi-cylindrical faces, and optional mounting hole 825. Coils 830 provide for the magnetization of electro-permanent magnets 810, 815 to be switched. The magnetic components are sandwiched between two stainless steel stator gear-wheels 840, 845, with composite stub-involute/arc gear teeth 850, 855 on the surface of each. Also shown are optional dowel-pin holes 860, which may be advantageously employed to simplify alignment between top 840 and bottom wheels 845. Rotor 865 comprises iron ring 870, sandwiched between two rotor gears 875, 880, having teeth 885 designed to mate with teeth 850, 855 of stator gear wheels 840, 845. The mating gears have the same module (ratio of number of teeth to diameter), in order to allow meshing [Suzumori, K. Hori, K., Micro electrostatic wobble motor with toothed electrodes, Micro Electro Mechanical Systems, 1997. MEMS '97, Proceedings, IEEE., Tenth Annual International Workshop on, pp. 227-232, Nagoya, Japan]. In the embodiment shown, rotor gears 875, 880 have one more tooth each than stator gears 840, 845, so that the stator rotates a small amount each time the magnetization of the stator arms is switched, in a manner similar to the mode of operation described for the exemplary embodiment of FIGS. 1A-B and 2A-B.

One further advantage of this design is that it is possible to design the wheels so that there is a continuously moving, single line of contact between the inner and outer contact wheel (for example, according to the procedure in Suzumori, K., Hori, K., Micro electrostatic wobble motor with toothed electrodes, Micro Electro Mechanical Systems, 1997. MEMS '97, Proceedings, IEEE., Tenth Annual International Workshop on, pp. 227-232, Nagoya, Japan). This simplifies kinematic analysis of the motor. For balance and stability, it is generally advantageous to have two contact wheels, one on the top and one on the bottom of the magnetic components, but this should not be seen as limiting the scope of the present invention and other configurations may be advantageous for certain applications.

Electropermanent Stepper Motor with Rotary Configuration. In another preferred embodiment of the invention, there is an inner rotor and outer stator. The rotor and stator are concentric. The rotor is fixed with a bearing so that it is free to rotate relative to the stator, but not to move substantially in any other direction. In one preferred implementation, both the rotor and stator are made substantially of iron and the stator has six arms. Each arm contains an electropermanent magnet. The electropermanent magnets consist of an Nd—Fe—B magnet and an Alnico magnet, in parallel. Each arm has a coil of copper wire wrapped around it. Opposite coils are connected together into three electrical phases, yielding a six-wire device. Both the rotor and stator have salient teeth placed on the same pitch. The teeth on each pair of opposite arms of the stator are out of phase with each other, in the manner of a standard toothed stepper motor. Magnets on opposite arms are polarized such that, when opposing magnets are turned on, magnetic flux may flow through both opposing magnets.

Figure 9A:
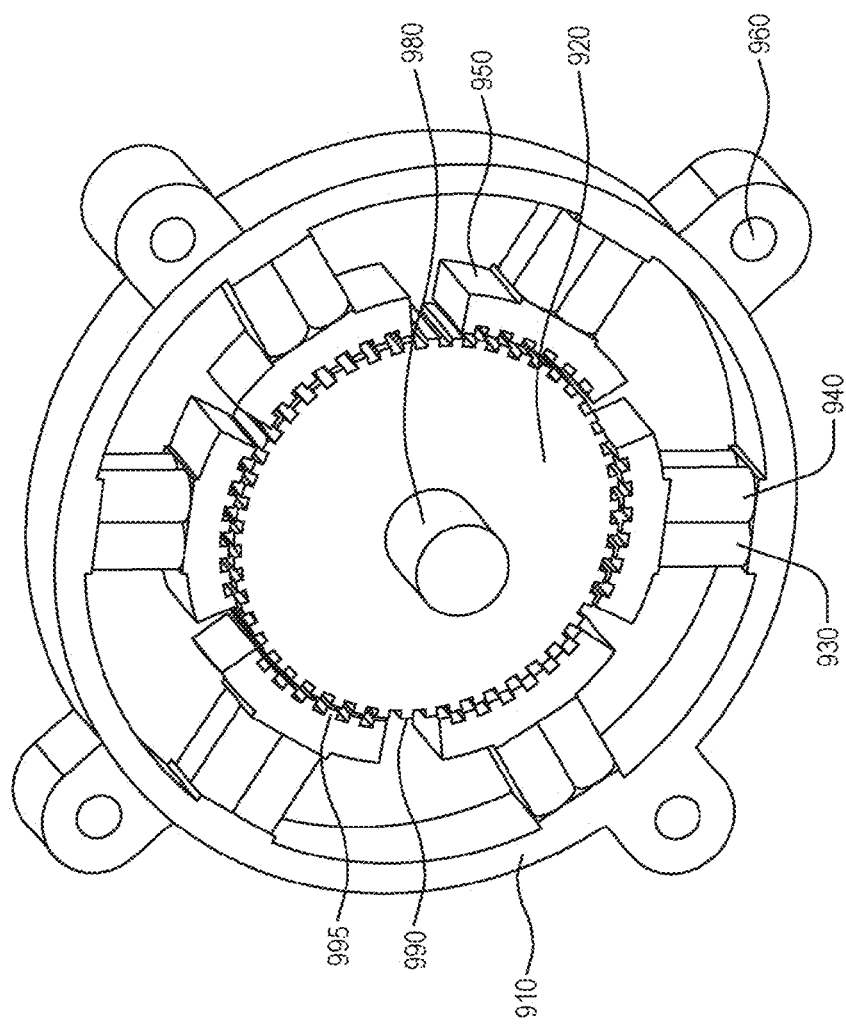
FIGS. 9A and 9B depict an exemplary embodiment of an electropermanent stepper motor, rotary configuration, before and after the installation of coils, respectively, according to one aspect of the present invention.
Figure 9B:
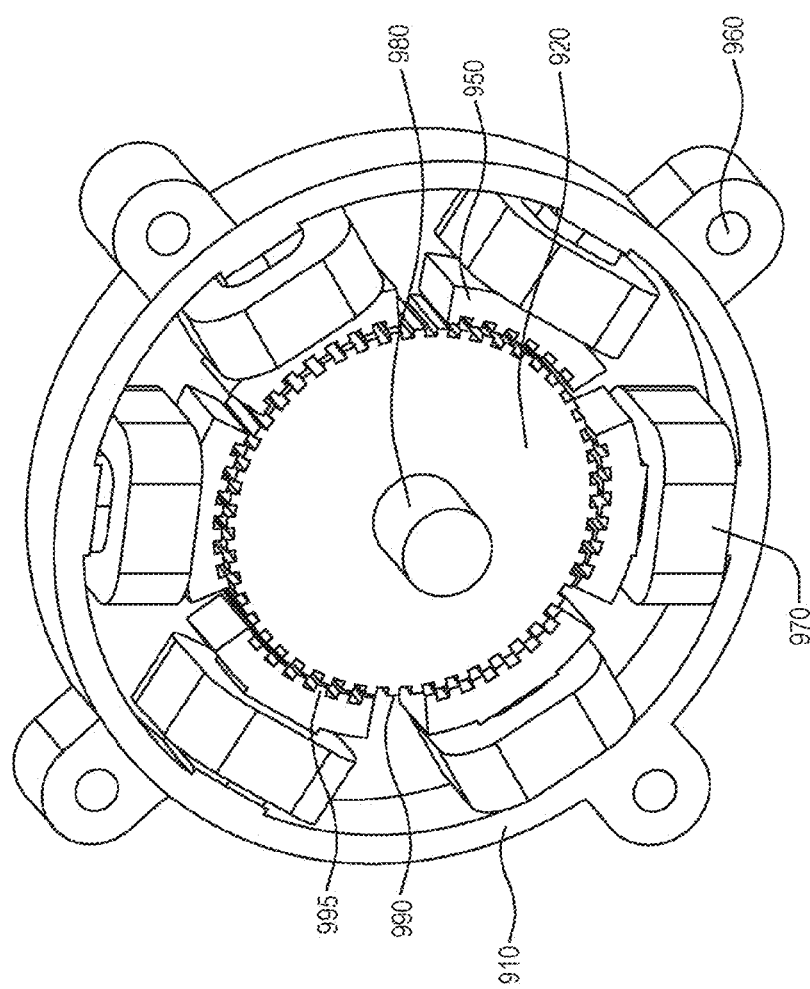
Figure 10:
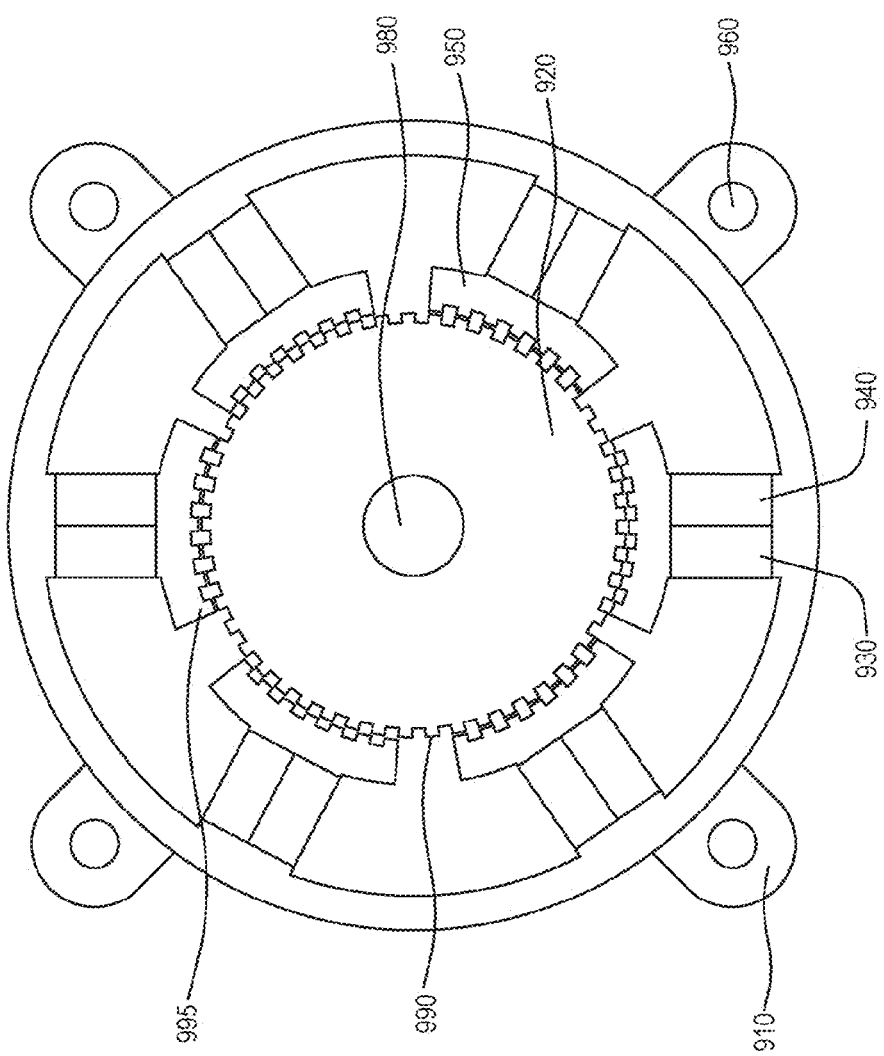
FIG. 10 is a plan view of an exemplary embodiment of an electropermanent stepper motor, rotary configuration, before the installation of coils, respectively, according to one aspect of the present invention.

FIGS. 9A and 9B depict an exemplary embodiment of an electropermanent stepper motor, rotary configuration, before and after the installation of coils, respectively, and FIG. 10 is a plan view of an exemplary embodiment of an electropermanent stepper motor, rotary configuration, before the installation of coils, according to this aspect of the present invention. In the embodiment depicted in FIGS. 9A-B and 10, stator 910 is exterior to rotor 920 and comprises Alnico magnets 930, NdFeB magnets 940, stator arm ends 950, optional stator mounting holes 960, and coils 970. Rotor 920 turns on shaft 980. Rotor 920 and stator arm ends 950 may have optional teeth 990, 995, respectively.

Operation of a motor according to this embodiment is as follows: Starting with all magnets off, the rotor is free to rotate. A current pulse through one electrical phase in the proper direction turns on two opposing magnets. The rotor rotates to cause the poles of the rotor and of those opposing stator arms to come into alignment, in a position of minimum air-gap reluctance. The motor will exert torque to hold the rotor at this position without further power input. When the next step is desired, an opposite current pulse disengages the first arm, and a current pulse through the second electrical phase activates the second arm, pulling the rotor into the next position.

In an alternative embodiment, turning on the magnets connected to more than one electrical phase at a time results in the rotor coming to rest at an intermediate position, a behavior known to those skilled in the art of electric motors as microstepping. In another alternative, turning on the magnets connected to one or more electrical phases with different degrees of magnetic field, for example by applying a large forward current pulse and then a smaller reverse current pulse, allows the motor to apply a tunable amount of torque, and also allows the motor to be set to come to rest at arbitrary intermediate positions between steps. It will further be clear to one of skill in the art that this pictured embodiment is exemplary only, and that many of the variations discussed in conjunction with the embodiment of FIGS. 1A-B and 2A-B would also be suitable for use in a rotary configuration embodiment according to the present invention.

Electropermanent Linear Actuator. In one preferred application of the invention, electropermanent magnets are used in a linear actuator. In this embodiment, one member, the forcer, is constrained by a linear bearing to be free to move in one linear direction but not to move substantially in any other direction. A spring connects the forcer to the stator. An electropermanent magnet applies a force to pull the forcer to one position when the magnet is on, and another position when the magnet is off.

Figure 11A:
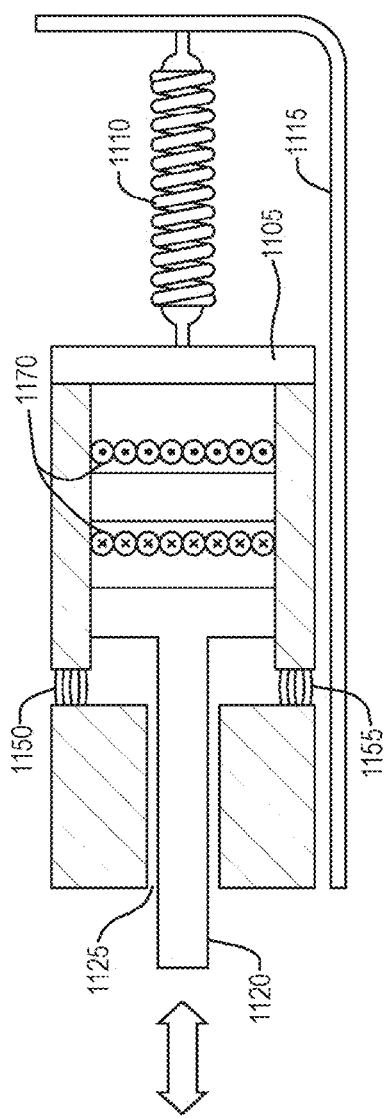
FIGS. 11A and 11B depict an exemplary embodiment of an electropermanent linear actuator, according to one aspect of the present invention.
Figure 11B:
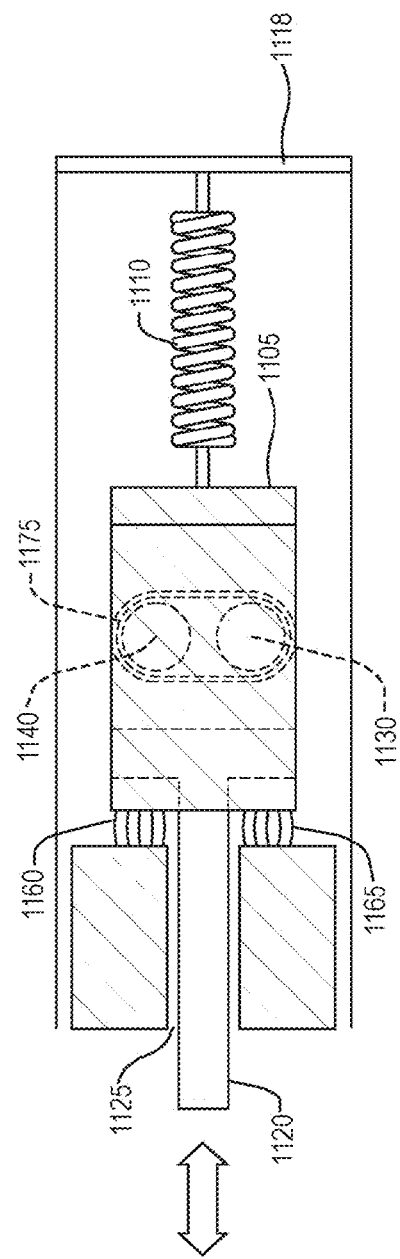

FIGS. 11A and 11B depict exemplary embodiments of an electropermanent linear actuator, according to one aspect of the present invention. Depicted in FIGS. 11A and 11B are forcer 1105, spring 1110, stator 1115, 1118, actuation shaft 1120, linear bearing 1125, Alnico magnet 1130, neodymium magnet 1140, magnetic field air gaps 1150, 1155, 1160, 1165 and coils 1170, 1175.

One application for such an actuator is a fluidic value (for example, but not limited to, for switching a flow of air or water). A current pulse in one direction opens the valve. A current pulse in the other direction closes the valve. No electrical power is required to keep the value in the same state. Other applications, such as a latching electrical relay, or any application normally served by a linear actuator, are possible.

As will be apparent to one skilled in the art of mechanical design, the spring does not need to be a discrete element, but may alternatively be a flexure, so that the forcer and stator are one mechanical part but designed to have a low stiffness in one direction so that the electropermanent magnet can move them relative to one another. In an alternative embodiment, there is no spring or flexure, and two electropermanent magnets are used. In one position, one is on and the other is off. In the other position, the activation of the magnets is reversed. In yet another alternative embodiment, multiple magnets are used, and one or more is switched on to move the forcer to different positions by applying different amounts of force. It will further be clear to one of skill in the art that these embodiments are exemplary only, and that many of the variations discussed in conjunction with the motor of FIGS. 1A-B and 2A-B would also be suitable for use in an electropermanent linear actuator according to the present invention.

In one alternative embodiment, the electropermanent magnet or magnets are activated with a controllable force level to move the actuator to a precise position. This may be used to make, for example, a proportional flow-rate value. In another alternative embodiment, more than one axis movement is allowed, and controllable using multiple electro-permanent magnets. For example, a hexapod six-degree-of-freedom flexural positing stage may be used with six electro-permanent magnets, whose force is controllable, to allow positioning a stage with six degrees of freedom. This may be useful, for example, as part of a micro-machining tool, or as the stage of a microscope.

Figure 12:
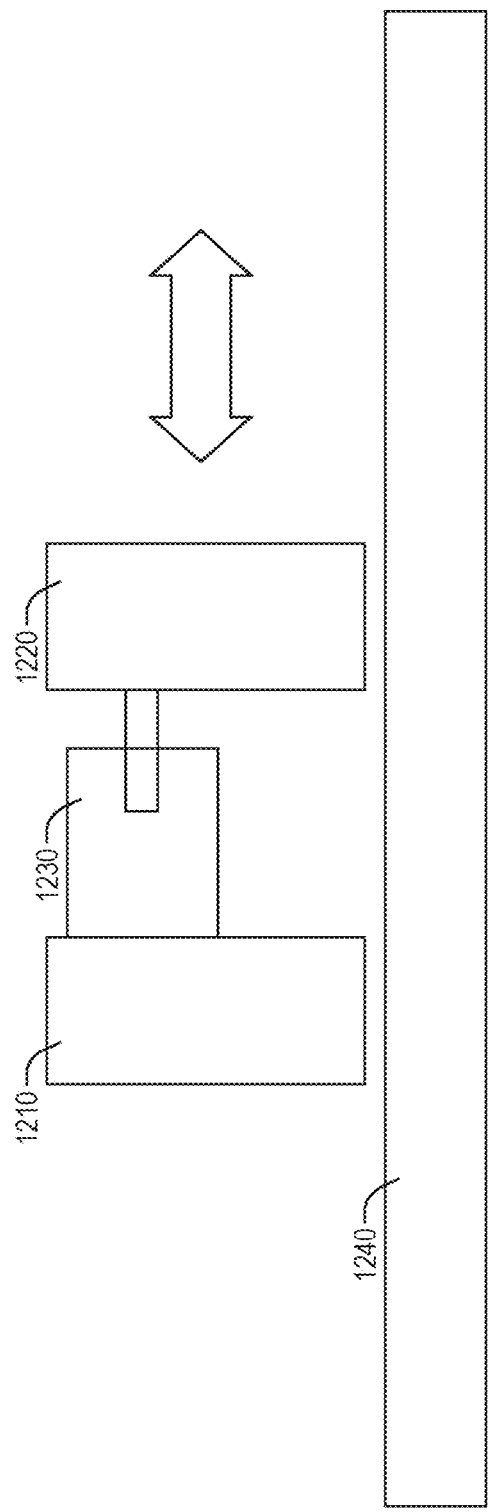
FIG. 12 depicts an exemplary embodiment of an electropermanent inchworm motor, according to one aspect of the present invention.

Electropermanent Inchworm Motor. In another preferred embodiment, electropermanent magnets are used to build an inchworm motor, capable of controlled movement along a surface made of iron or other magnetic material. An inchworm motor can be used, for example, for programmable positioning of an optical component on an iron plate. For a linear inchworm motor, two electropermanent magnets are used as clamps to hold the motor to the iron table. A linear actuator, such as, for example, but not limited to, the one described previously, connects the two halves of the motor together. FIG. 12 depicts an exemplary embodiment of an electropermanent inchworm motor, according to one aspect of the present invention. As shown in FIG. 12, electropermanent magnets 1210, 1220 clamp electropermanent linear actuator 1230 to iron plate 1240.

Operation of the inchworm motor: If both clamp magnets are turned on, the inchworm holds itself in a fixed position on the iron plate. To move in one direction, one clamp is turned off, the linear actuator is compressed, the clamp is turned on, the other clamp is turned off, the linear actuator is expanded, and the other clamp is turned back on. The inchworm will now have moved to a new position.

It will be clear to a person skilled in the art of the invention that it is possible to combine multiple inchworm motors facing in different directions in order to achieve an inchworm motor capable of translation and rotation in multiple directions. It will also be clear to a person skilled in the art that the clamp magnets may have curved faces to allow the inchworm motor to move on the inside or outside faces of a cylinder, sphere, or other curved shape. It will further be clear to one of skill in the art that these embodiments are exemplary only, and that many of the variations discussed in conjunction with the motor of FIGS. 1A-B and 2A-B would also be suitable for use in an electropermanent inchworm motor according to the present invention.

While preferred embodiments of the invention are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An electropermanent magnet-based motor, comprising:
   a stator section, the stator section comprising:
      at least one electropermanent magnet; and
      at least one coil located around the electropermanent magnet, the coil being configured to pass sequential current pulses that change the magnetization of the electropermanent magnet, the change in magnetization persisting after current is removed from the coil;
   a rotor section, the rotor being movable with respect to the stator in response to the persistent changes in the magnetization of the at least one electropermanent magnet; and
   motor drive circuitry configured for controlling and actuating the motor, the motor drive circuitry comprising:
      a power source configured to produce the sequential current pulses, the voltage and duration of the pulses being of sufficient magnitude to change the magnetization of the electropermanent magnet such that the change in magnetization will persist after cessation of the current, the voltage and current produced by the power source returning substantially to zero between pulses;
      a feedback control mechanism configured to determine, based on motor velocity or position, when a next one of the sequential current pulses should be issued, the issuance of the pulses being timed such that the motor will continue to turn throughout the duration of the period of absence of applied current that occurs between the sequential pulses; and
      at least one switch configured to signal the power source to start and stop producing the next one of the sequential current pulses according to the determination made by the feedback control mechanism.

2. The motor of claim 1, the stator further comprising:
   a centrally-located stator core; and
   a plurality of stator arms radiating outward from the stator core, at least one electropermanent magnet being integral to each stator arm and a coil being located around the at least one electropermanent magnet on each stator arm, the stator being located within the rotor in such a configuration that the rotor may rotate around the stator arms.

3. The motor of claim 2, wherein the stator core and stator arms are formed from a single piece of material.

4. The motor of claim 1, wherein the at least one electropermanent magnet comprises two independently-controllable magnets made of materials having different coercivities.

5. The motor of claim 2, wherein the at least one electropermanent magnet comprises two independently-controllable magnets made of materials having different coercivities.

6. The motor of claim 5, wherein one of the two magnets is an Alnico alloy magnet and the other is a neodymium alloy magnet.

7. The motor of claim 2, the end of each stator arm further comprising integrated stator gear teeth and rotor interior further comprising integrated rotor gear teeth, the stator gear teeth meshing with the rotor gear teeth.

8. The motor of claim 2, further comprising:
at least one coaxial gear wheel or friction roller, the gear wheel or friction roller comprising wheel teeth and being located above and below the plane occupied by the stator; and
the rotor further comprising a ring sandwiched between two rotor gears having rotor teeth designed to mate with the wheel teeth of the stator gear wheel or friction roller.

9. The motor of claim 1, further comprising a high-friction coating on at least one of the rotor or stator surfaces.

10. The motor of claim 1, the stator further comprising:
anteriorly-located stator core, the stator being exterior to the rotor; and
a plurality of stator arms radiating inward from the stator core at least one electropermanent magnet being integral to each stator arm and a coil being located around the at least one electropermanent magnet on each stator arm, the rotor being centrally-located within the stator in such a configuration that the rotor may rotate within the stator arms, the rotor further being configured to rotate about its axis.

11. The motor of claim 10, wherein the stator core and stator arms are formed from a single piece of material.

12. The motor of claim 10, wherein the at least one electropermanent magnet comprises two independently-controllable magnets made of materials having different coercivities.

13. The motor of claim 12, wherein one of the two magnets is an Alnico alloy magnet and the other is an neodymium alloy magnet.

14. The motor of claim 10, the end of each stator arm further comprising integrated stator gear teeth and the rotor exterior further comprising integrated rotor gear teeth, the stator gear teeth meshing with the rotor gear teeth.

15. The motor of claim 10, further comprising a shaft located at the rotor axis.

\* \* \* \* \*